(12) United States Patent
He

(10) Patent No.: US 11,227,514 B2
(45) Date of Patent: Jan. 18, 2022

(54) COVER, MANUFACTURING METHOD OF COVER, AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Chunmei He, Hubei (CN)

(73) Assignee: WUHAN CHINA STAR OPTOELECTRONICS SEMICONDUCTOR DISPLAY TECHNOLOGY CO., LTD., Hubei (CN)

(*) Notice: Subject to any disclaimer, the term of this patent is extended or adjusted under 35 U.S.C. 154(b) by 0 days.

(21) Appl. No.: 16/770,660

(22) PCT Filed: Mar. 25, 2020

(86) PCT No.: PCT/CN2020/081196
§ 371 (c)(1),
(2) Date: Jun. 8, 2020

(87) PCT Pub. No.: WO2021/109364
PCT Pub. Date: Jun. 10, 2021

(65) Prior Publication Data
US 2021/0174710 A1    Jun. 10, 2021

(30) Foreign Application Priority Data
Dec. 6, 2019 (CN) ............ 201911241501.8

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01); *G06F 1/1656* (2013.01)

(58) Field of Classification Search
CPC combination set(s) only.
See application file for complete search history.

(56) References Cited

U.S. PATENT DOCUMENTS 10,008,695 B2 * 6/2018 Park ............ H01L 27/323
10,082,839 B1 * 9/2018 Turchin ............ G06F 1/1681
(Continued)

FOREIGN PATENT DOCUMENTS

CN    107452284 A    12/2017
CN    109671363 A    4/2019
(Continued)

Primary Examiner — Lisa Lea-Edmonds
(74) Attorney, Agent, or Firm — Hamre, Schumann, Mueller & Larson, P.C.

(57) ABSTRACT

The present disclosure provides a cover, a manufacturing method of the cover, and a display device. The cover includes a planar region and a bending region. The cover also includes a substrate, a flexible layer, and a hard layer disposed in a stack. A thickness of the substrate in the planar region is greater than a thickness of the substrate in the bending region. Decreasing the thickness of the substrate in the bending region can improve bendability of the cover, and the hard layer can ensure hardness of the planar region at a same time. Combination of the two can make the cover achieve high hardness and good bendability at the same time.

17 Claims, 5 Drawing Sheets

(56) References Cited

U.S. PATENT DOCUMENTS

| | | | |
|---|---|---|---|
| 10,429,904 B2* | 10/2019 | Turchin | G06F 1/1641 |
| 10,474,196 B2* | 11/2019 | Yeh | G06F 1/1641 |
| 10,964,918 B1* | 3/2021 | Chang | H04M 1/0266 |
| 11,003,217 B2* | 5/2021 | Cha | G06F 1/1652 |
| 2017/0060188 A1* | 3/2017 | Han | G06F 1/1681 |
| 2018/0152550 A1* | 5/2018 | Dharmatilleke | H04B 1/3888 |
| 2019/0041913 A1* | 2/2019 | Yeh | G06F 1/1652 |
| 2019/0051223 A1 | 2/2019 | Li et al. | |
| 2019/0265758 A1* | 8/2019 | Han | G06F 1/1641 |
| 2019/0380219 A1* | 12/2019 | Lee | G06F 3/0416 |
| 2020/0214156 A1* | 7/2020 | Zhong | H04M 1/0268 |
| 2021/0041601 A1* | 2/2021 | Oh | G02F 1/133331 |

FOREIGN PATENT DOCUMENTS

| | | | |
|---|---|---|---|
| CN | 110047393 A | 7/2019 | |
| CN | 110164315 A | 8/2019 | |
| CN | 209358595 U | 9/2019 | |
| CN | 110379306 A | 10/2019 | |

* cited by examiner

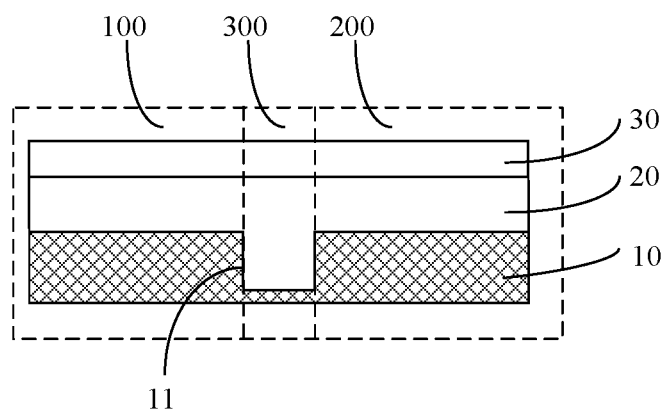
FIG. 5
FIG. 6
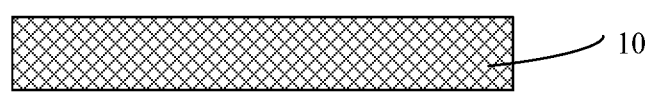
FIG. 7
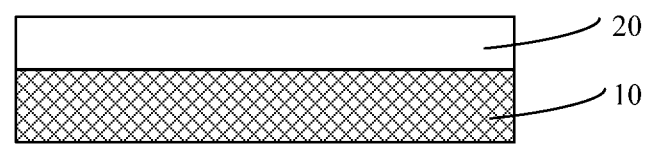
FIG. 8

COVER, MANUFACTURING METHOD OF COVER, AND DISPLAY DEVICE

FIELD OF INVENTION

The present disclosure relates to the field of display technologies, and more particularly, to a cover, a manufacturing method of the cover, and a display device.

BACKGROUND OF INVENTION

Foldable mobile phones are a development trend of future technology, and correspondingly adopted covers need to take into account both hardness and bendability. Current covers usually use a stacked structure of glass, polyimide, and a hard layer. To ensure hardness, a hard layer needs to meet a predetermined thickness, but bendability of covers will be affected when the thickness of the hard layer is greater. Hardness and bendability are mutually restrictive and cannot be perfectly balanced.

Therefore, current covers have a technical problem of being unable to simultaneously achieve both hardness and bendability, which needs to be improved.

Technical problem: the present disclosure provides a cover and a display device to relieve the technical problem that current covers cannot simultaneously achieve both hardness and bendability.

SUMMARY OF INVENTION

To solve the above problems, an embodiment of the present disclosure provides following technical solutions:

an embodiment of the present disclosure provides a cover which comprises a planar region and a bending region connected to the planar region. The cover further comprises:

a substrate having a thickness in the planar region that is greater than a thickness in the bending region;

a flexible layer disposed on one side of the substrate; and a hard layer disposed on one side of the flexible layer away from the substrate.

In the cover of the present disclosure, wherein in the bending region, a groove is defined on one side of the substrate away from the flexible layer.

In the cover of the present disclosure, wherein a depth of the groove is less than or equal to the thickness of the substrate.

The cover of the present disclosure further comprises a filling layer disposed in the groove.

In the cover of the present disclosure, wherein the filling layer comprises at least one of silicone optical adhesive or self-healing material.

In the cover of the present disclosure, wherein a thickness of the filling layer is less than or equal to the depth of the groove.

The present disclosure further provides a manufacturing method of a cover including a planar region and a bending region connected to the planar region. The manufacturing method comprises following steps:

providing a substrate and disposing a flexible layer on one side of the substrate, wherein a thickness of the substrate in the planar region is greater than a thickness of the substrate in the bending region; and disposing a hard layer on one side of the flexible layer away from the substrate.

In the manufacturing method of the cover, wherein the step of providing the substrate and disposing the flexible layer on one side of the substrate, wherein the thickness of the substrate in the planar region is greater than the thickness of the substrate in the bending region, comprises:

providing the substrate;

disposing the flexible layer on the side of the substrate; and defining a groove on one side of the substrate away from the flexible layer, wherein the groove corresponds to the bending region.

In the manufacturing method of the cover, wherein the step of defining the groove on the side of the substrate away from the flexible layer, wherein the groove corresponds to the bending region, comprises defining the groove having a depth less than or equal to the thickness of the substrate on the side of the substrate away from the flexible layer.

In the manufacturing method of the cover, wherein the step of disposing the hard layer on the side of the flexible layer away from the substrate comprises:

disposing a protective layer in the groove, wherein the protective layer extends to cover the side of the substrate away from the flexible layer;

disposing the hard layer on the side of the flexible layer away from the substrate; and stripping off the protective layer.

The manufacturing method of the cover further comprises disposing a filling layer in the groove after the step of stripping off the protective layer.

In the manufacturing method of the cover, wherein the step of disposing the filling layer in the groove comprises disposing the filling layer having a material of at least one of silicone optical adhesive or self-healing material in the groove.

In the manufacturing method of the cover, wherein the step of disposing the filling layer in the groove comprises disposing the filling layer having a thickness less than or equal to the depth of the groove in the groove.

In the manufacturing method of the cover, wherein the step of disposing the filling layer in the groove comprises printing to form the filling layer in the groove.

The present disclosure further provides a display device which comprises a cover and a display panel. The cover comprises a planar region and a bending region connected to the planar region, wherein the cover further comprises:

a substrate having a thickness in the planar region that is greater than a thickness in the bending region;

a flexible layer disposed on one side of the substrate; and a hard layer disposed on one side of the flexible layer away from the substrate.

In the display device of the present disclosure, wherein in the bending region, a groove is defined on one side of the substrate away from the flexible layer.

In the display device of the present disclosure, wherein a depth of the groove is less than or equal to the thickness of the substrate.

In the display device of the present disclosure, the cover further comprises a filling layer disposed in the groove.

In the display device of the present disclosure, wherein the filling layer comprises at least one of silicone optical adhesive or self-healing material.

In the display device of the present disclosure, wherein a thickness of the filling layer is less than or equal to the depth of the groove.

Beneficial effect: the beneficial effect of the present disclosure is that: the present disclosure provides a cover, a manufacturing method of the cover, and a display device. The cover comprises a planar region and a bending region connected to the planar region. The cover comprises a substrate, a flexible layer, and a hard layer. A thickness of the substrate in the planar region is greater than a thickness of the substrate in the bending region. The flexible layer is disposed on one side of the substrate, and the hard layer is disposed on one side of the flexible layer away from the substrate. Decreasing the thickness of the substrate in the bending region can improve bendability of the cover, and the hard layer can ensure hardness of the planar region at a same time. Combination of the two can make the cover achieve high hardness and good bendability at the same time.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

FIG. 5 is a third schematic film layer structural diagram of a cover according to an embodiment of the present disclosure.

FIG. 6 is a flowchart of a manufacturing method of a cover according to an embodiment of the present disclosure.

FIG. 7 is a schematic diagram of a cover in a first step of the manufacturing method according to an embodiment of the present disclosure.

FIG. 8 is a schematic diagram of a cover in a second step of the manufacturing method according to an embodiment of the present disclosure.

DETAILED DESCRIPTION OF PREFERRED EMBODIMENTS

Figure 1:
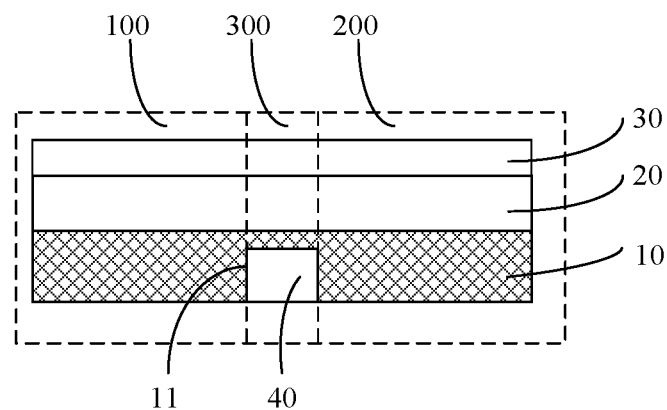
FIG. 1 is a first schematic film layer structural diagram of a cover according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. In the description of the present disclosure, it should be understood that terms such as "upper", "lower", "front", "rear", "left", "right", "inside", "outside", "side", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure.

The present disclosure provides a cover to relieve the technical problem that current covers cannot simultaneously achieve both hardness and bendability.

In current technology, foldable mobile phones are a development trend of future technology, and covers corresponding to foldable mobile phones have also become a focus of research. Covers used in foldable mobile phones not only need a certain degree of hardness to protect the phones, but also need a certain degree of bendability to fold with foldable mobile phones.

Current covers usually use glass substrates. Because technology for bending glass is yet to be mature, a stacked structure of disposing transparent polyimide and a hard layer on a glass substrate is the mainstream development direction. To ensure sufficient hardness, a hard layer needs to reach a predetermined thickness. However, bendability of a cover will be affected when the thickness of the hard layer is greater. Although bendability can be improved if the thickness of the hard layer is reduced, hardness will also decrease, which cannot provide sufficient protection to foldable mobile phones. Hardness and bendability are mutually restrictive and cannot be perfectly balanced.

Therefore, current covers have a technical problem of not being able to simultaneously achieve both hardness and bendability, which needs to be improved.

As shown in FIG. 1, FIG. 1 is a first schematic film layer structural diagram of a cover according to an embodiment of the present disclosure. A cover comprises a planar region and a bending region 300 connected to the planar region. The cover further comprises a substrate 10, a flexible layer 20, and a hard layer 30. A thickness of the substrate 10 in the planar region is greater than a thickness of the substrate 10 in the bending region 300. The flexible layer 20 is disposed on one side of the substrate 10, and the hard layer 30 is disposed on one side of the flexible layer 20 away from the substrate 10.

Figure 3:
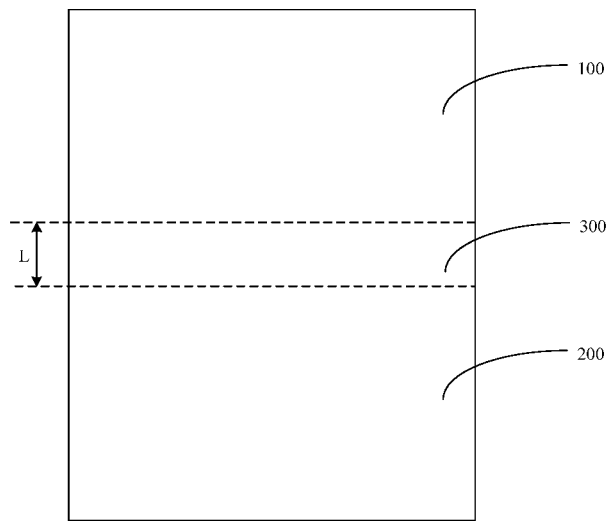
FIG. 3 is a schematic planar structural diagram of a cover in an expanded state according to an embodiment of the present disclosure.
Figure 4:
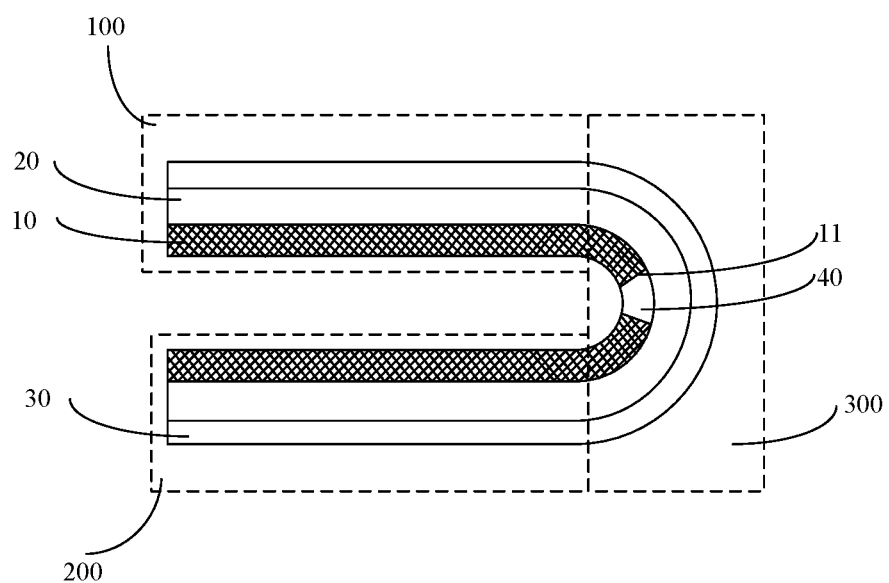
FIG. 4 is a schematic film layer diagram of a cover in a bending state according to an embodiment of the present disclosure.

The cover in the embodiment of the present disclosure can be used in flexible display panels, such as foldable mobile phones. The cover comprises the planar region and the bending region 300 connected to the planar region. As shown in FIG. 3, FIG. 3 is a schematic planar structural diagram of a cover in an expanded state according to an embodiment of the present disclosure. The planar region includes a first planar region 100 and a second planar region 200, the bending region 300 is disposed between the first planar region 100 and the second planar region 200, and a length of the bending region 300 is L. As shown in FIG. 4, FIG. 4 is a schematic film layer diagram of a cover in a bending state according to an embodiment of the present disclosure. After the cover is bent, the first planar region 100 and the second planar region 200 are in a planar state, and the bending region 300 is in a bending state, wherein a bending shape may be a semicircle.

The substrate 10 is usually a glass substrate, and a thickness of the substrate 10 in the planar region is greater than a thickness of the substrate 10 in the bending region 300.

A material of the flexible layer 20 is usually transparent polyimide. Because polyimide has excellent heat resistance, radiation resistance, chemical resistance, electrical insulation, and mechanical property, polyimide is widely used in flexible devices. Of course, the material of the flexible layer 20 is not limited to this, and it also can be other flexible materials.

The hard layer 30 is a transparent material having greater hardness, and the hard layer 30 can ensure the hardness of the cover, thereby protecting the display panel. The hard layer 30 can use resin materials, silicon dioxide, titanium dioxide, etc., and can be disposed on the flexible layer 20 by spray coating technique or sputtering technique. The forming method is not limited to these, and the hard layer 30 can also be formed by plating technique or coating technique.

The hard layer 30 in the present disclosure is disposed as a whole layer, which ensures the hardness of the cover and allows the entire panel to satisfy performances of high hardness, anti-friction, and shock resistance. In addition, the thickness of the substrate 10 is less in the bending region 300, thereby improving bendability of the cover, reducing a bending radius, and increasing service life. Combination of the two can make the cover achieve high hardness and good bendability at the same time.

The thickness of the substrate 10 in the bending region 300 is less than that in the planar region, and there are many disposition ways. In an embodiment of the present disclosure, as shown in FIG. 1, in the bending region 300, a groove 11 is defined on one side of the substrate 10 away from the flexible layer 20.

A cross-sectional shape of the groove 11 may be trapezoidal, rectangular, or semicircular, and it can also be other shapes. It should be noted that the cross-sectional shape of the groove 11 is a shape when the substrate 10 is not in a bending state.

In FIG. 1, a depth of the groove 11 is less than the thickness of the substrate 10. When the substrate 10 is glass, the groove 11 is formed by inductively coupled plasma etching, and other etching methods can also be used to form the groove 11. The substrate 10 having the groove 11 can also be directly and integrally formed when manufacturing the substrate 10. A width of the groove 11 can be equal to the length L of the bending region 300 and also can be slightly less than the length of the bending region 300. In an embodiment of the present disclosure, after etching, a thickness of unetched substrate 10 in the bending region 300 ranges from 10 μm to 50 μm. Because the unetched part has a lesser thickness, the cover can improve bendability and reduce the bending radius when bending. In addition, it also can increase the service life of the cover. In an embodiment of the present disclosure, the cover can be bent up to 200,000 times.

In an embodiment of the present disclosure, the cover further comprises a filling layer 40 disposed in the groove 11. A thickness of the filling layer 40 is less than or equal to the depth of the groove 11. Due to existence of the groove 11, there is a step between the substrate 10 in the bending region 300 and the substrate 10 the planar region. In order to fill the step, the filling layer 40 is disposed in the groove 11.

The filling layer 40 comprises at least one of silicone optical adhesive or self-healing material.

The silicone optical adhesive comprises a silica gel layer and release films on top and bottom sides of the silica gel layer. The silica gel has characteristics of high adsorption, good thermal stability, stable chemical property, and higher mechanical strength, and the silicone optical adhesive has characteristics of transparency, high light transmittance, good bonding strength, ability to be cured at room temperature or a moderate temperature, and small curing shrinkage, so the silicone optical adhesive can improve buffering characteristics of the bending region 300.

The self-healing material can prevent scratches generated by the cover from permanent deformation. When the cover has a scratch or a small crack, the self-healing material in the filling layer 40 will release and perform a sequence of chemical reactions at the same time to re-aggregate the two surfaces of two sides of the scratch or the small crack, thereby ensuring original materials are restored to a flatness of about 75%.

Figure 2:
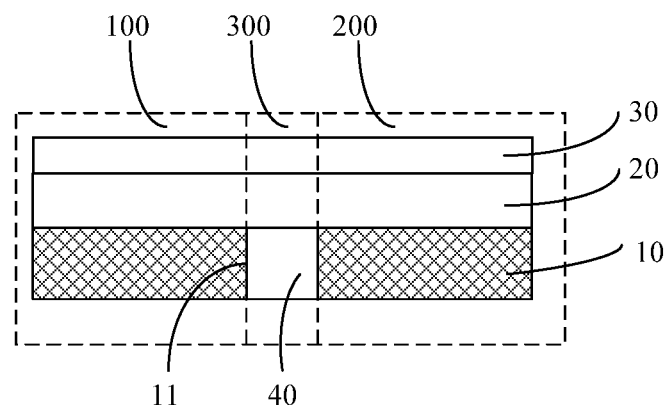
FIG. 2 is a second schematic film layer structural diagram of a cover according to an embodiment of the present disclosure.

As shown in FIG. 2, FIG. 2 is a second schematic film layer structural diagram of a cover according to an embodiment of the present disclosure. The difference from the structure in FIG. 1 is that the depth of the groove 11 in the embodiment is equal to the depth of the substrate 10. That is, the groove 11 is a through-hole, the substrate 10 is divided into a part disposed in the first planar region 100 and another part disposed in the second planar region 200, and the two parts are not connected.

In an embodiment of the present disclosure, the cover further comprises a filling layer 40 disposed in the groove 11. A thickness of the filling layer 40 is less than or equal to the depth of the groove 11 to fill the step between the substrate 10 in the bending region 300 and the substrate 10 in the planar region. The filling layer 40 comprises at least one of silicone optical adhesive or self-healing material.

Because the substrate 10 in the bending region 300 is entirely etched, the cover can improve bendability and reduce the bending radius when bending. In addition, it also can increase the service life of the cover. In an embodiment of the present disclosure, the cover can be bent up to 200,000 times.

As shown in FIG. 5, FIG. 5 is a third schematic film layer structural diagram of a cover according to an embodiment of the present disclosure. The difference from the structures in FIG. 1 and FIG. 2 is that the groove 11 in the embodiment is defined on one side of the substrate 10 adjacent to the flexible layer 20. That is, in the bending region 300, the substrate 10 is provided with the groove 11, and the flexible layer 20 is disposed in the groove 11 and extends to cover the substrate 10.

In the embodiment, the depth of the groove 11 is less than or equal to the thickness of the substrate 10. The groove 11 is formed by inductively coupled plasma etching and other etching methods can also be used to form the groove 11. The substrate 10 having the groove 11 can also be directly and integrally formed when manufacturing the substrate 10. A part of the flexible layer 20 is disposed in the groove 11, another part of the flexible layer 20 extends to cover the substrate 10, and one side of the finally formed flexible layer 20 away from the substrate 10 is a flat surface. That is, the flexible layer 20 itself fills the step between the substrate 10 in the bending region 300 and the substrate 10 in the planar region.

Because the thickness of the substrate 10 in the bending region 300 is less, the cover can improve bendability and reduce the bending radius when bending. In addition, it also can increase the service life of the cover. In an embodiment of the present disclosure, the cover can be bent up to 200,000 times.

The present disclosure further provides a manufacturing method of a cover including a planar region and a bending region connected to the planar region. As shown in FIG. 6, the manufacturing method comprises specific steps of:

S1: providing a substrate and disposing a flexible layer on one side of the substrate, wherein a thickness of the substrate in the planar region is greater than a thickness of the substrate in the bending region; and S2: disposing a hard layer on one side of the flexible layer away from the substrate.

The cover in the embodiment of the present disclosure can be used in flexible display panels, such as foldable mobile phones. The cover comprises the planar region and the bending region 300 connected to the planar region. As shown in FIG. 3, FIG. 3 is a schematic planar structural diagram of a cover in an expanded state according to an embodiment of the present disclosure. The planar region includes a first planar region 100 and a second planar region 200, the bending region 300 is disposed between the first planar region 100 and the second planar region 200, and a length of the bending region 300 is L. As shown in FIG. 4, FIG. 4 is a schematic film layer diagram of a cover in a bending state according to an embodiment of the present disclosure. After the cover is bent, the first planar region 100 and the second planar region 200 are in a planar state, and the bending region 300 is in a bending state, wherein a bending shape may be a semicircle.

The following describes the manufacturing method with reference to FIGS. 7 to 14.

Specifically, the step S1 comprises:

S11: providing the substrate. As shown in FIG. 8, the substrate 10 is provided first, and the substrate 10 is a glass substrate.

Figure 9:
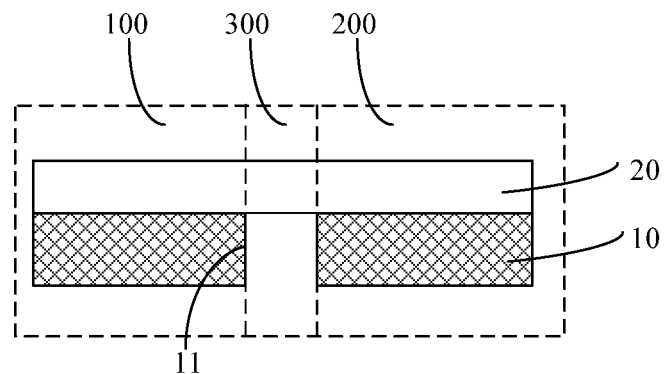
FIG. 9 is a schematic diagram of a cover in a third step of the manufacturing method according to an embodiment of the present disclosure.

S12: disposing the flexible layer on the side of the substrate. As shown in FIG. 9, disposing the flexible layer 20 on the side of the substrate. A material of the flexible layer 20 is usually transparent polyimide. Because polyimide has excellent heat resistance, radiation resistance, chemical resistance, electrical insulation, and mechanical property, polyimide is widely used in flexible devices. Of course, the material of the flexible layer 20 is not limited to this, it also can be other flexible materials. The flexible layer 20 is disposed on the substrate 10 by coating.

S13: defining a groove on one side of the substrate away from the flexible layer, wherein the groove corresponds to the bending region. As shown in FIG. 9, the groove 11 is defined on the side of the substrate 10 away from the flexible layer 20. The groove 11 may be formed by inductively coupled plasma etching, and other etching methods can also be used to form the groove 11. In another embodiment, the substrate 10 having the groove 11 can also be integrally formed without subsequent etching.

A cross-sectional shape of the groove 11 may be trapezoidal, rectangular, or semicircular, and it can also be other shapes. It should be noted that the cross-sectional shape of the groove 11 is a shape when the substrate 10 is not in a bending state.

In an embodiment, a depth of the groove 11 is less than or equal to the thickness of the substrate 10.

When the depth of the groove 11 is less than the thickness of the substrate 10, it is half-etched. In an embodiment of the present disclosure, after etching, a thickness of unetched substrate 10 in the bending region 300 ranges from 10 μm to 50 μm. Because the unetched part has a lesser thickness, the cover can improve bendability and reduce the bending radius when bending.

When the depth of the groove 11 is equal to the thickness of the substrate 10, it is completely etched. That is, the groove 11 is a through-hole, the substrate 10 is divided into a part disposed in the first planar region 100 and another part disposed in the second planar region 200, and the two parts are not connected. Because the substrate 10 in the bending region 300 is entirely etched, the cover can improve bendability and reduce the bending radius when bending.

A width of the groove 11 can be equal to the length L of the bending region 300 and also can be slightly less than the length of the bending region 300.

Figure 10:
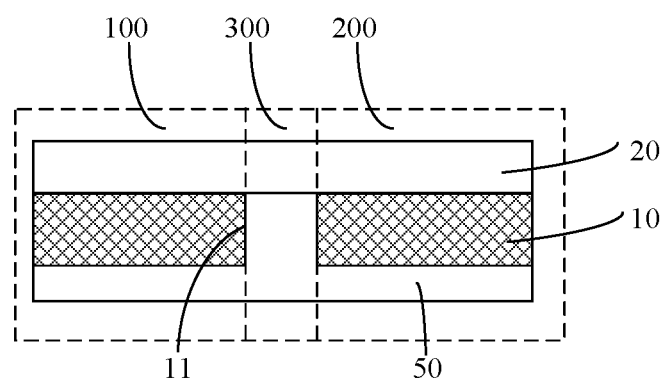
FIG. 10 is a schematic diagram of a cover in a fourth step of the manufacturing method according to an embodiment of the present disclosure.

Specifically, the step S2 comprises:

S21: disposing a protective layer in the groove, wherein the protective layer extends to cover the side of the substrate away from the flexible layer. As shown in FIG. 10, the protective layer 50 is disposed and filled in the groove 11. The protective layer 50 is in contact with the flexible layer 20 and extends to cover one side surface of the substrate 10 away from the flexible layer 20. Because the flexible layer 20 is softer and the thickness of the substrate 10 in the bending region 300 is less, when subsequently disposing other film layers on the flexible layer 20, the flexible layer 20 in the bending region is easy to be bent to deformation, which makes the finally manufactured cover unable to meet requirements. Therefore, disposing the protective layer 50 before forming other film layers can have a supporting effect for the flexible layer 20 to prevent the flexible layer 20 from deformation. In addition, when the groove 11 is a through-hole, the protective layer 50 also can prevent a part of the flexible layer 20 in the bending region 300 from being exposed outside and being polluted.

Figure 11:
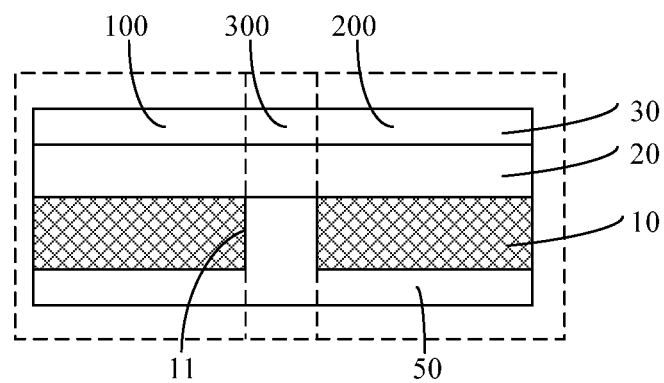
FIG. 11 is a schematic diagram of a cover in a fifth step of the manufacturing method according to an embodiment of the present disclosure.

S21: disposing the hard layer on the side of the flexible layer away from the substrate. As shown in FIG. 11, disposing the hard layer 30 on the side of the flexible layer 20 away from the substrate 10. The hard layer 30 is a transparent material having greater hardness and can ensure the hardness of the cover, thereby protecting the display panel. The hard layer 30 can use resin materials, silicon dioxide, titanium dioxide, etc., and can be disposed on the flexible layer 20 by spray coating technique or sputtering technique. The forming method is not limited to these, and the hard layer 30 can also be formed by plating technique or coating technique.

Figure 12:
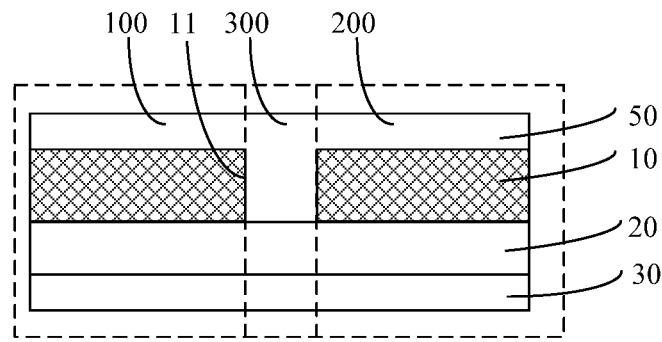
FIG. 12 is a schematic diagram of a cover in a sixth step of the manufacturing method according to an embodiment of the present disclosure.
Figure 13:
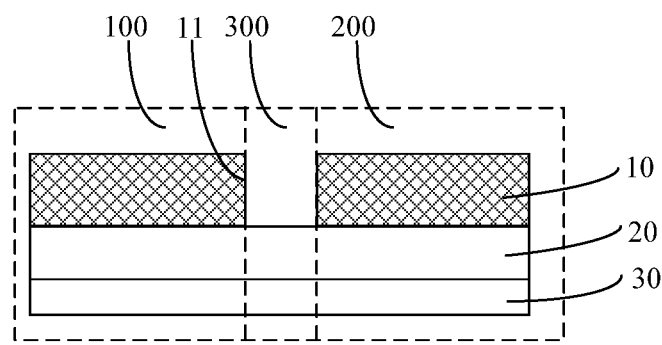
FIG. 13 is a schematic diagram of a cover in a seventh step of the manufacturing method according to an embodiment of the present disclosure.

S21: stripping off the protective layer. As shown in FIG. 12, before stripping off the protective layer 50, flip the cover 180 degrees to make the protective layer 50 be the top layer, and then strip off the protective layer 50. It is more convenient to strip off the protective layer 50 when the protective layer 50 is the top layer, and of course, the protective layer 50 can also be stripped off directly without flipping. The protective layer 50 is used to support and protect the flexible layer 20 and does not need to be disposed in the final cover, so the protective layer 50 is stripped off after manufacturing the hard layer 30. A structure of the cover after stripping off the protective layer 50 is as shown in FIG. 13.

Figure 14:
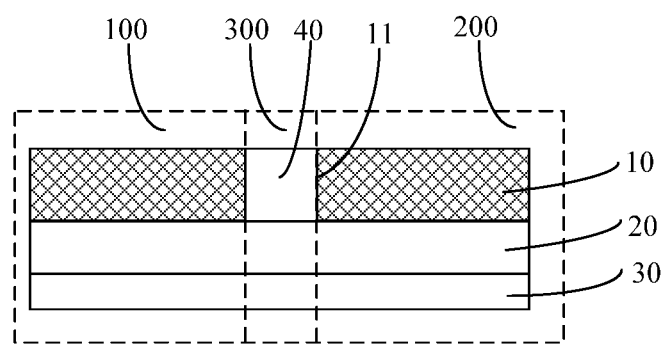
FIG. 14 is a schematic diagram of a cover in an eighth step of the manufacturing method according to an embodiment of the present disclosure.

In an embodiment of the present disclosure, a filling layer can also be disposed in the groove 11. As shown in FIG. 14, the filling layer 40 is disposed in the groove 11. A thickness of the filling layer 40 is less than or equal to the depth of the groove 11. Due to existence of the groove 11, there is a step between the substrate 10 in the bending region 300 and the substrate 10 the planar region. In order to fill the step, the filling layer 40 is disposed in the groove 11.

The filling layer 40 comprises at least one of silicone optical adhesive or self-healing material and can be formed in the groove 11 by printing.

The silicone optical adhesive comprises a silica gel layer and release films on top and bottom sides of the silica gel layer. The silica gel has characteristics of high adsorption, good thermal stability, stable chemical property, and higher mechanical strength, and the silicone optical adhesive has characteristics of transparency, high light transmittance, good bonding strength, ability to be cured at room temperature or a moderate temperature, and small curing shrinkage, so the silicone optical adhesive can improve buffering characteristics of the bending region 300.

The self-healing material can prevent scratches generated by the cover from permanent deformation. When the cover has a scratch or a small crack, the self-healing material in the filling layer 40 will release and perform a sequence of chemical reactions at the same time to re-aggregate the two surfaces of two sides of the scratch or the small crack, thereby ensuring original materials are restored to a flatness of about 75%.

The cover can be obtained by the above steps and can be used in flexible display devices, such as foldable mobile phones.

It should be noted that the thickness of the substrate 10 in the bending region 300 is less than the thickness of the substrate 10 in the planar region, and there are also other disposition ways. In an embodiment of the present disclosure, the groove 11 can be disposed on one side of the substrate 10 adjacent to the flexible layer 20. That is, in the bending region 300, the substrate 10 is provided with the groove 11, and the flexible layer 20 is disposed in the groove 11 and extends to cover the substrate 10.

The depth of the groove 11 is less than or equal to the thickness of the substrate 10. The groove 11 is formed by inductively coupled plasma etching, and other etching methods can also be used to form the groove 11. The substrate 10 having the groove 11 can also be directly and integrally formed when manufacturing the substrate 10. A part of the flexible layer 20 is disposed in the groove 11, another part of the flexible layer 20 extends to cover the substrate 10, and one side of the finally formed flexible layer 20 away from the substrate 10 is a flat surface. That is, the flexible layer 20 itself fills the step between the substrate 10 in the bending region 300 and the substrate 10 in the planar region.

Because the thickness of the substrate 10 in the bending region 300 is less, the cover can improve bendability and reduce the bending radius when bending.

The hard layer 30 in the method is disposed as a whole layer, which ensures the hardness of the cover and allows the entire panel to satisfy performances of high hardness, anti-friction, and shock resistance. In addition, the thickness of the substrate 10 is less in the bending region 300, thereby improving bendability of the cover, reducing a bending radius, and increasing service life. Combination of the two can make the cover achieve high hardness and good bendability at the same time.

The present disclosure further provides a display device which comprises a cover and a display panel. The cover comprises a planar region and a bending region connected to the planar region. The cover further comprises a substrate, a flexible layer, and a hard layer. A thickness of the substrate in the planar region is greater than a thickness of the substrate in the bending region. The flexible layer is disposed on one side of the substrate, and the hard layer is disposed on one side of the flexible layer away from the substrate.

In an embodiment of the present disclosure, in the bending region, a groove is defined on one side of the substrate away from the flexible layer.

In an embodiment, a depth of the groove is less than or equal to the thickness of the substrate.

In an embodiment of the present disclosure, the cover further comprises a filling layer disposed in the groove.

In an embodiment of the present disclosure, the filling layer comprises at least one of silicone optical adhesive or self-healing material.

In an embodiment of the present disclosure, a thickness of the filling layer is less than or equal to the depth of the groove.

In an embodiment of the present disclosure, in the bending region, the substrate is provided with the groove, and the flexible layer is disposed in the groove and extends to cover the substrate.

In the display device provided by the present disclosure, the hard layer 30 in the cover is disposed as a whole layer, which ensures the hardness of the cover and allows the entire panel to satisfy performances of high hardness, anti-friction, and shock resistance. In addition, the thickness of the substrate 10 is less in the bending region 300, thereby improving bendability of the cover, reducing a bending radius, and increasing service life. Combination of the two can make the cover achieve high hardness and good bendability at the same time, thereby making the display device achieve high hardness and good bendability at the same time.

In the above embodiments, the description of each embodiment has its own emphasis. For the parts that are not described in detail in an embodiment, can refer to the detailed description of other embodiments above.

The cover, the manufacturing method of the cover, and the display device provided by the present disclosure are described in detail above. The specific examples are applied in the description to explain the principle and implementation of the disclosure. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A cover, comprising a planar region and a bending region connected to the planar region, wherein the cover comprises:
    a substrate having a thickness in the planar region that is greater than a thickness in the bending region;
    a flexible layer disposed on one side of the substrate; and
    a hard layer disposed on one side of the flexible layer away from the substrate;
    wherein in the bending region, a groove is defined on one side of the substrate away from the flexible layer.

2. The cover according to claim 1, wherein a depth of the groove is less than or equal to the thickness of the substrate in the bending region.

3. The cover according to claim 2, further comprising a filling layer disposed in the groove.

4. The cover according to claim 3, wherein the filling layer comprises at least one of silicone optical adhesive or self-healing material.

5. The cover according to claim 3, wherein a thickness of the filling layer is less than or equal to the depth of the groove.

6. A manufacturing method of a cover including a planar region and a bending region connected to the planar region, comprising following steps:
- providing a substrate, disposing a flexible layer on one side of the substrate, and defining a groove corresponding to the bending region on one side of the substrate away from the flexible layer, wherein a thickness of the substrate in the planar region is greater than a thickness of the substrate in the bending region; and
- disposing a hard layer on one side of the flexible layer away from the substrate.

7. The manufacturing method of the cover according to claim 6, wherein the step of defining the groove corresponding to the bending region on the side of the substrate away from the flexible layer comprises defining the groove having a depth less than or equal to the thickness of the substrate in the bending region on the side of the substrate away from the flexible layer.

8. The manufacturing method of the cover according to claim 7, wherein the step of disposing the hard layer on the side of the flexible layer away from the substrate comprises:
- disposing a protective layer in the groove, wherein the protective layer extends to cover the side of the substrate away from the flexible layer;
- disposing the hard layer on the side of the flexible layer away from the substrate; and
- stripping off the protective layer.

9. The manufacturing method of the cover according to claim 8, further comprising disposing a filling layer in the groove after the step of stripping off the protective layer.

10. The manufacturing method of the cover according to claim 9, wherein the step of disposing the filling layer in the groove comprises disposing the filling layer having a material of at least one of silicone optical adhesive or self-healing material in the groove.

11. The manufacturing method of the cover according to claim 9, wherein the step of disposing the filling layer in the groove comprises disposing the filling layer having a thickness less than or equal to the depth of the groove in the groove.

12. The manufacturing method of the cover according to claim 9, wherein the step of disposing the filling layer in the groove comprises printing to form the filling layer in the groove.

13. A display device, comprising a cover and a display panel, wherein the cover comprises a planar region and a bending region connected to the planar region, wherein the cover further comprises:
- a substrate having a thickness in the planar region that is greater than a thickness in the bending region;
- a flexible layer disposed on one side of the substrate; and
- a hard layer disposed on one side of the flexible layer away from the substrate;
- wherein in the bending region, a groove is defined on one side of the substrate away from the flexible layer.

14. The display device according to claim 13, wherein a depth of the groove is less than or equal to the thickness of the substrate in the bending region.

15. The display device according to claim 14, wherein the cover further comprises a filling layer disposed in the groove.

16. The display device according to claim 15, wherein the filling layer comprises at least one of silicone optical adhesive or self-healing material.

17. The display device according to claim 15, wherein a thickness of the filling layer is less than or equal to the depth of the groove.

* * * * *